US006943323B2

(12) United States Patent
Iannucci

(10) Patent No.: US 6,943,323 B2
(45) Date of Patent: Sep. 13, 2005

(54) BATTERY OPERATED SELF HEATING THERMOS CONTAINER

(76) Inventor: Claudine Iannucci, 23730 Glenbrook, Saint Clair Shores, MI (US) 48082

( * ) Notice: Subject to any disclaimer, the term of this patent is extended or adjusted under 35 U.S.C. 154(b) by 127 days.

(21) Appl. No.: 10/661,339

(22) Filed: Sep. 15, 2003

(65) Prior Publication Data

US 2004/0211766 A1 Oct. 28, 2004

Related U.S. Application Data

(60) Provisional application No. 60/465,001, filed on Apr. 25, 2003.

(51) Int. Cl.[7] ............................. A47J 36/26; A47J 27/09
(52) U.S. Cl. ........................................ 219/438; 219/387
(58) Field of Search ................................. 219/387, 438, 219/436, 441

(56) References Cited

U.S. PATENT DOCUMENTS

| | | | | |
|---|---|---|---|---|
| 1,062,344 A | * | 5/1913 | Mann | 219/436 |
| 1,414,494 A | * | 5/1922 | Arntfield | 219/415 |
| 2,277,605 A | * | 3/1942 | Palitzsch | 219/439 |
| 2,546,983 A | * | 4/1951 | Buttero | 219/436 |
| 3,423,571 A | * | 1/1969 | Trachtenberg et al. | 219/441 |
| 3,432,641 A | * | 3/1969 | Welke | 219/433 |
| 3,549,861 A | * | 12/1970 | Trachtenberg et al. | 219/441 |
| 3,931,494 A | * | 1/1976 | Fisher et al. | 219/441 |
| 4,095,090 A | * | 6/1978 | Pianezza | 219/441 |
| 4,250,398 A | * | 2/1981 | Ellis et al. | 219/549 |
| 4,490,597 A | * | 12/1984 | Mengel | 219/735 |
| 4,801,782 A | * | 1/1989 | Ineson | 219/438 |
| 4,959,528 A | * | 9/1990 | Malloy | 219/432 |
| 5,680,108 A | * | 10/1997 | Daniell et al. | 99/285 |
| 5,946,936 A | * | 9/1999 | Bengtson | 62/457.2 |
| 6,140,614 A | * | 10/2000 | Padamsee | 219/438 |
| 6,864,462 B2 | * | 3/2005 | Sanoner et al. | 219/387 |

* cited by examiner

Primary Examiner—Joseph Pelham

(57) ABSTRACT

A thermos container with inner sealing cap and outer cap used to contain solid or liquid foods. Integral heating coils contained within the innermost compartment of the receptacle receives energy from the main power cord connected to the On/Off sliding switch power conductor. When the sliding switch is moved to the On position it activates the battery power to heat the integral coils to a certain temperature to warm the contents of the thermos container. With such applications the invention is a battery operated self heating thermos thus allowing for storage and heat to foods contained within the inner receptacle.

5 Claims, 4 Drawing Sheets

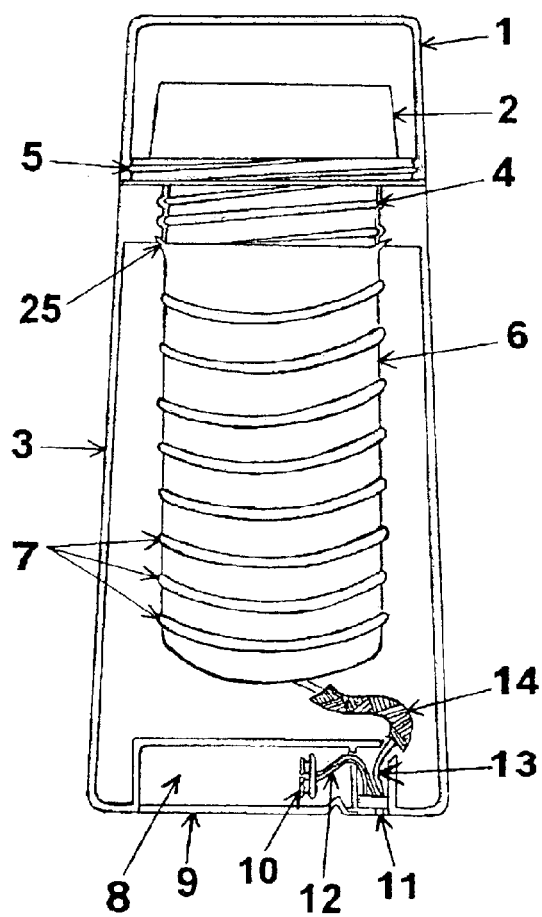
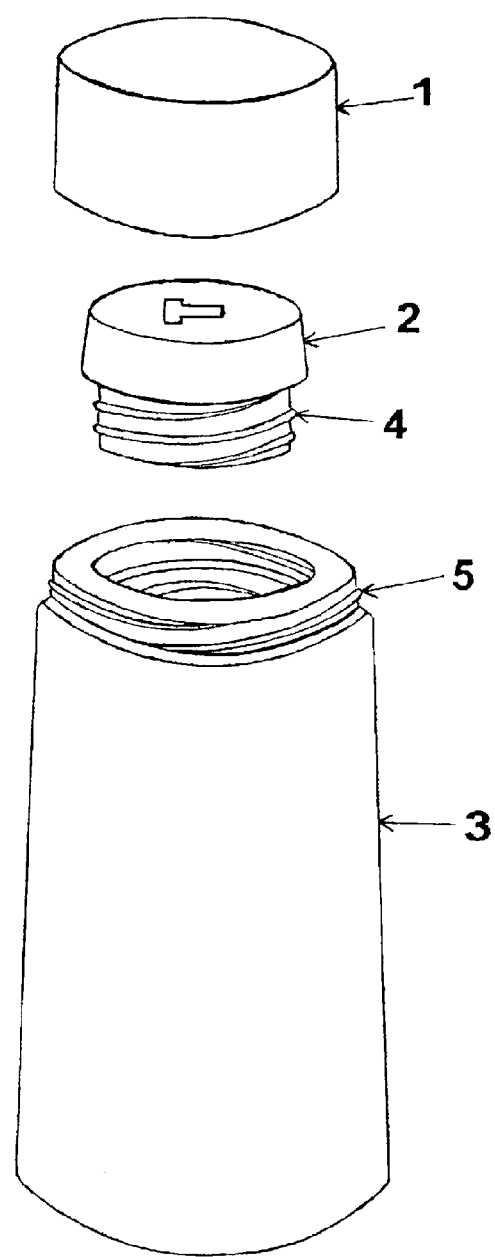

15

16

15

4

15
17
18
18
19
19
16

BATTERY OPERATED SELF HEATING THERMOS CONTAINER

CROSS-REFERENCE TO RELATED APPLICATIONS

This application claims the priority of provisional application Ser. No. 60/465,001 filed on Apr. 25, 2003.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Many food containers are provided for storage of foods solid and liquid, such containers as a thermos apply many elements to retain either a cooling effect to keep foods cold or a thermal area to retain heat as to keep foods warm. Most of these containers can only keep food stored and warm for a certain period of time. As with many thermos style containers the space provided between the walls of the outer and inner receptacles is for retaining heat to warm the contents. This method cannot keep foods or liquids warm for very long. Also foods contained in such thermos style containers tend to become stewed in their own warmth causing the contents to become undesirable for consumption. The general idea of this invention is to provide a source of heat with the application of battery power and heating coils thus making it unique from other thermos containers.

BRIEF SUMMARY OF THE INVENTION

The operation of this invention is fairly simple, when the power switch is put to the on position, the battery sends energy to the inner heating coils. The battery being a lower voltage will only heat the coils to a certain safe temperature. The coils will then heat the inner metal container. The heat conducted will then warm the contents of the inner metal container. The outer compartment is made of a heat safe plastic thus not allowing it to heat the outside. It will remain cool to the touch. The contents will be sealed by a seal-tight cap and an outer plastic cap. The outer cap will be made of the heat safe plastic. The outer plastic cap is removed during the warming process. The inner seal-tight cap will have a steam heat release valve that is lifted to the open position to release any gases created by the contents during heating. The gas will rise up through the inner chamber of the seal-tight cap through the steam heat release valve allowing for no build up of steam heat. This design will make it safe for the consumer use. The invention is a simple and effective product designed to provide a typical thermos style container with integral heating coils. This allows the invention to not only store food and beverages but to heat it on demand.

This application will provide for heating the contents of the inner receptacle on command thus alleviating any stewing of the food contents which may occur with conventional thermos containers. Cold foods such as left overs normally eaten warm will be available for consumers heated on command without the need for any other heating method such as an oven or microwave. This reduces household waste by allowing consumers to provide meals from home while consumers are mobile or "on the go." This said invention takes the typical thermos and adds the benefit of an outer heat safe plastic, joined with a metal inner container. Benefits of this invention are the heat safe plastic which allows for safe handling of the thermos while it is heating the contents. The inner metal container is washable to remove any residue left behind from prior usage. The battery power alleviates the possibilities of scalding or overheating the contents that would cause any injury to the consumer. Rechargeable batteries may be used to power the unit. Also the materials used to construct the invention are readily available making the invention absolutely feasible, effective, and usable. The durability of this invention is reassured by it's construction making it usable for consumers camping, fishing, construction workers, etc. The simple technology involved in this invention makes the invention very effective and capable of everyday usage by the consumer.

BRIEF DESCRIPTION OF THE SEVERAL VIEWS OF THE DRAWINGS

FIG. 1—Shows interior side view of the thermos with all attributes and components in place.

FIG. 2—Side exterior view of the thermos showing each attribute and component accordingly, outer cap, inner sealing cap, and bottom receptacle.

DETAILED DESCRIPTION OF THE INVENTION

Figure 3:
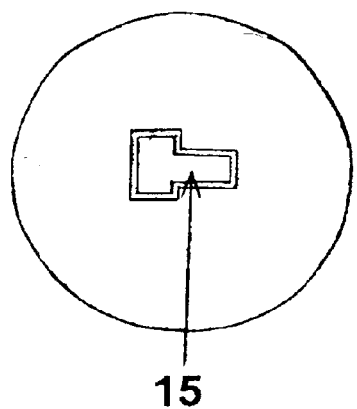
FIG. 3—Top view of inner sealing cap, showing steam heat release valve in closed position.

In FIG. 2 it shows the placement of the outer cap 1, inner sealing cap 2, and outer bottom receptacle 3. As for FIG. 1 the inner sealing cap 2 is threaded down to the outer bottom receptacle 3 by the sealing threads 4 for inner cap to secure contents of the inner metal container 6. The outer cap 1 is threaded down to outer receptacle 3 by the sealing threads 5 for outer cap, maintaining a sealed leak proof container. The inner metal container 6 is affixed to heat safe plastic by the inner lip retainer 25 within the outer receptacle 3. The integral heating coils 7 wrapped around the inner metal container 6 heat this container when the On/Off sliding switch 11 is moved to the on position. The battery connected to the battery adapters 10 conducts energy through the negative and positive power cords 12 to the On/Off sliding switch power conductor 26 to the main power cord 13 connected to the integral heating coils 7. An internal protective layer 14 is applied to the main power cord 13 to reduce and prevent breakdown of the main power cord 13 to integral heating coils 7 after repeated usage. The battery is contained within the battery compartment 8 secured by the battery compartment lid 9.

Figure 4:
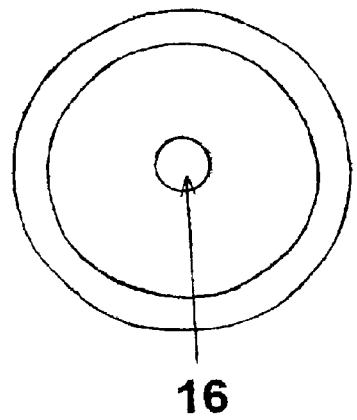
FIG. 4—Bottom view of inner sealing cap revealing steam heat chamber for steam heat release valve.
Figure 5:
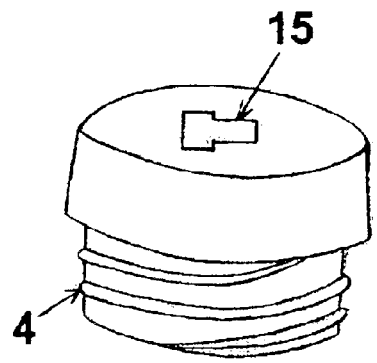
FIG. 5—Side view of inner sealing cap showing steam heat release valve in closed position and also revealing thread for closure to main bottom receptacle.
Figure 6:
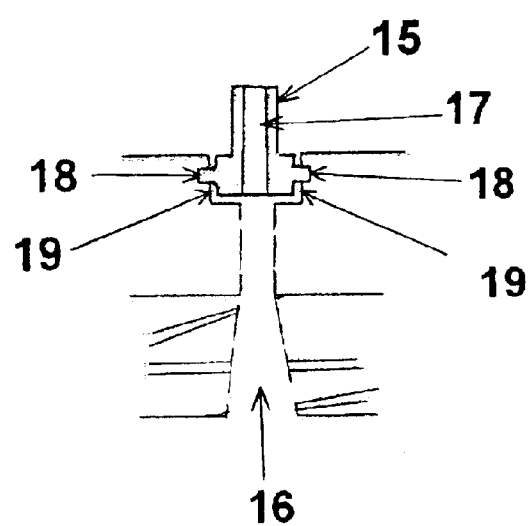
FIG. 6—Showing interior side view of steam heat release valve in open position, the chamber for the steam heat to pass through, and it also reveals the application used for the steam heat release valve.

In FIG. 3 the steam heat release valve 15 of the inner sealing cap 2 is left in the closed position while receptacle is not in use and is filled with contents. FIG. 4 reveals the steam heat chamber 16 that conducts the steam or gases released when food is heated within the container. FIG. 5 shows the side view of the inner sealing cap 2 with the steam heat release valve 15 in the closed position. FIG. 6 shows the steam heat release valve 15 in the open position, this position is used when the contents of the receptacle are being warmed. The steam heat chamber 16 guides the steam from foods warming up, through the steam heat release valve opening 17 allowing for reduction of pressure build up within the inner metal container 6. The steam heat release valve 15 is held in place by the valve tabs 18 inserted to the valve tab slots 19, making the apparatus moveable to the open or closed position.

Figure 7:
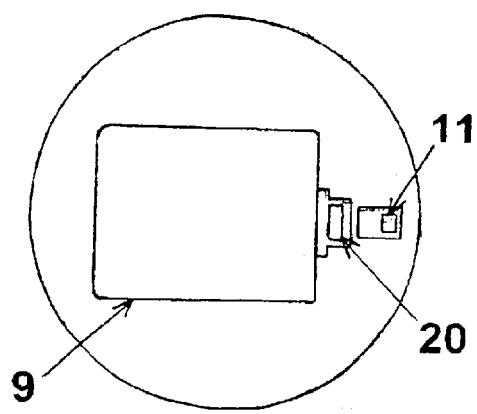
FIG. 7—Bottom view of the exterior thermos receptacle showing the on/off sliding switch and battery lid in closed position.
Figure 8:
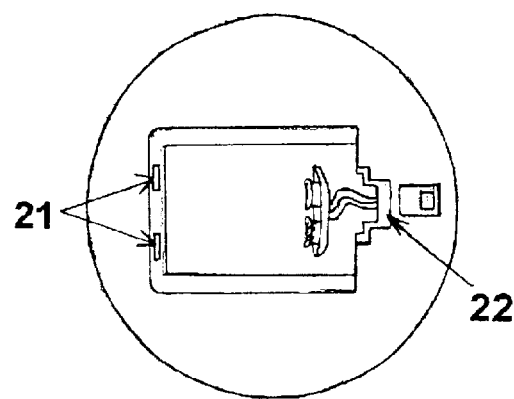
FIG. 8—Bottom view of the exterior thermos receptacle showing the open battery compartment and the battery adapter.
Figure 9:
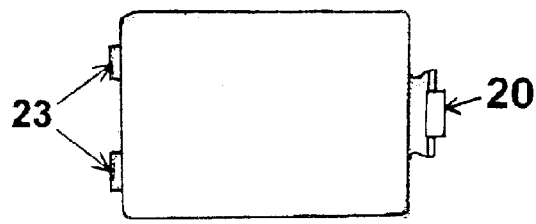
FIG. 9—Battery compartment lid
Figure 10:
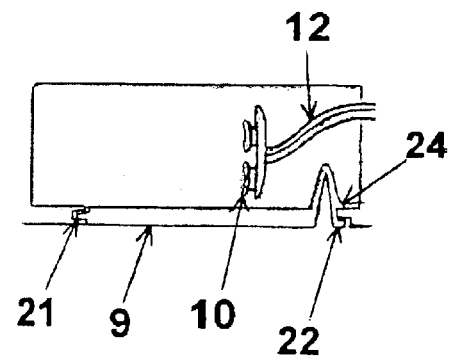
FIG. 10—Side interior view of battery compartment with battery compartment lid in closed position.

FIG. 7 shows the bottom of the outer bottom receptacle 3 revealing the area used to access the battery compartment 8. This figure shows the On/Off sliding switch 11 to the off position. To open the battery compartment lid 9 the battery compartment lid release/closure tab 20 is moved towards the opposite direction of the On/Off switch 11 and the battery compartment lid 9 is pulled up and removed. FIG. 8 reveals the battery compartment lid attachment slots 21 and the slot for the battery compartment lid release/closure tab 22 that hold the battery compartment lid 9 closed and secure. In FIG. 9 the battery compartment lid tabs 23 are placed into the battery compartment lid attachment slots 21 and the battery compartment lid release/closure tab 20 snaps into the slot for battery compartment lid release/closure tab 22. FIG. 10 shows the battery compartment lid 9 secured into place by the battery compartment lid attachment slots 21 and the lip tab 24 for the battery compartment lid release/closure tab that snaps back into place when the battery compartment lid 9 is pressed down. This ensures a secure compartment for the battery.

Figure 11:
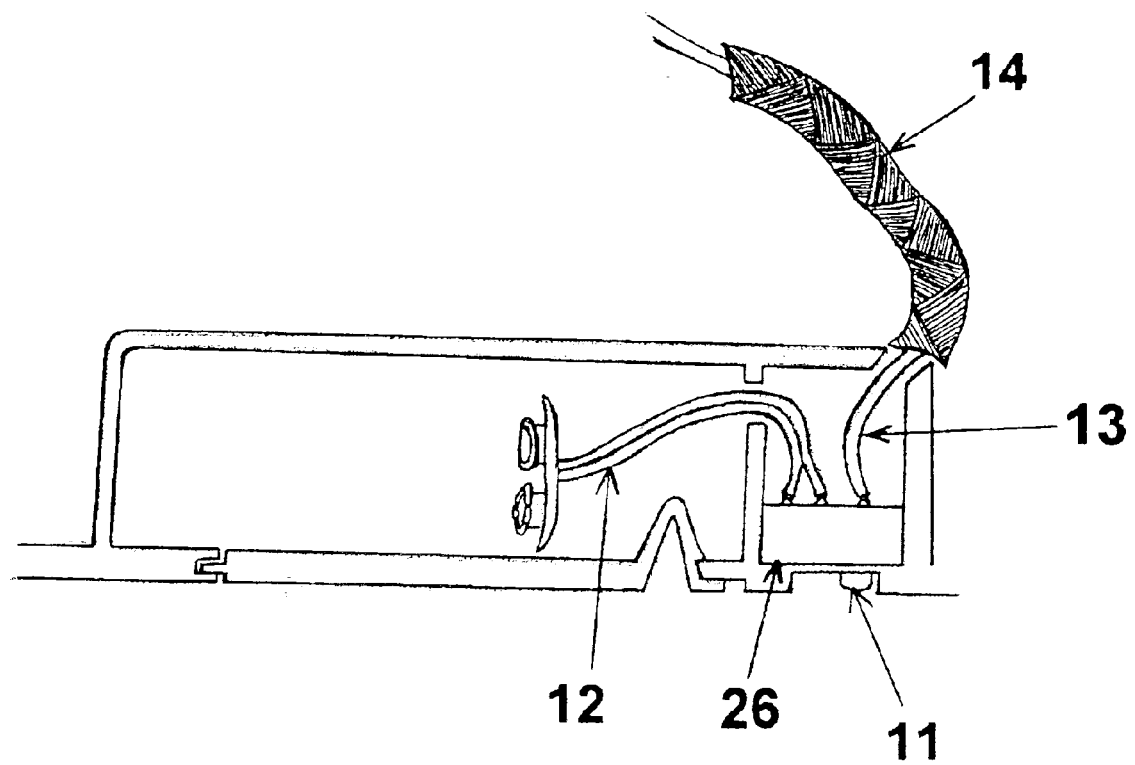
FIG. 11—Side interior view of battery compartment revealing on/off sliding switch with necessary components to transfer battery energy to heating coils.

In FIG. 11 when the On/Off sliding switch 11 is moved to the on position, the battery is activated and the negative and positive power cords 12 carry the battery energy to the sliding switch power conductor 26 to the main power cord 13 connected to the integral heating coils 7. This is how the battery energy will be carried to the heating elements and activate the warming process for the contents of the inner metal container 6.

As with all the detail disclosed of this invention many variations or modifications may be applied to the invention overall without leaving the general scope of the invention. This foregoing description should be considered illustrative and not limit the scope of the invention.

I claim:

1. A battery operated self heating thermal container for food or drink comprising:
    a) A cylindrical inner metal receptacle affixed to a cylindrical outer receptacle allowing for an interior area between the two said receptacles to house integral heating coils, main power cord and battery compartment,
    b) An outer cylindrical top cap with threads to seal the outer bottom receptacle,
    c) Threads along the top of the outer bottom receptacle to fasten with the threads of the outer top cap,
    d) An inner sealing cap to secure the contents of the inner metal receptacle with a steam heat release valve along with threads at the bottom of the inner sealing cap to join with threads within the inner top parameter of the cylindrical opening at the top of the inner metal container,
    e) Cylindrical tabs on the steam heat release valve to secure the valve to the inner sealing cap which also allows for proper positioning of the steam heat valve to it's open position allowing the steam heat chamber to conduct steam heat through steam heat valve opening.

2. The self heating thermal container of claim 1 comprising:
    a) Integral heating coils wound and affixed to the inner metal receptacle that receive energy from the main power cord connected to the power conductor.

3. Integral heating coils of claim 1 comprising materials of heat conducting copper and alloys.

4. The self heating thermal container of claim 1 comprising:
    a) Battery compartment and a battery compartment lid accessible at the bottom of the outer receptacle allowing for a secure area to contain the energy source for heating coils with an On/Off sliding switch also accessible at the outer bottom receptacle to manually power the battery energy,
    b) A battery adapter to connect a battery located at the interior of the battery compartment,
    c) Negative and positive power cords connected to the battery adapter that conduct energy from the battery to the power conductor of which the said cords are connected to.

5. The self heating thermal container of claim 1 comprising materials of heat safe plastics for outer bottom receptacle, inner sealing cap, and outer top cap.

* * * * *